March 10, 1959 D. MITCHELL 2,877,343

RADIANT ENERGY COMMUNICATION SYSTEM WITH CARRIER CONTROL

Filed May 18, 1955 3 Sheets-Sheet 1

INVENTOR
D. MITCHELL
BY B. H. Stoddard
ATTORNEY

RADIANT ENERGY COMMUNICATION SYSTEM WITH CARRIER CONTROL

Filed May 18, 1955

3 Sheets-Sheet 2

INVENTOR
D. MITCHELL
BY B. H. Stoddard
ATTORNEY

March 10, 1959 D. MITCHELL 2,877,343

RADIANT ENERGY COMMUNICATION SYSTEM WITH CARRIER CONTROL

Filed May 18, 1955 3 Sheets-Sheet 3

INVENTOR
D. MITCHELL
BY B. F. Stoddard
ATTORNEY

United States Patent Office 2,877,343

Patented Mar. 10, 1959

2,877,343

RADIANT ENERGY COMMUNICATION SYSTEM WITH CARRIER CONTROL

Doren Mitchell, Martinsville, N. J., assignor to Bell Telephone Laboratories, Incorporated, New York, N. Y., a corporation of New York Application May 18, 1955, Serial No. 509,239

15 Claims. (Cl. 250—6)

This invention relates to radiant energy signaling systems and, more particularly, to a signaling system for providing communication service over an extensive geographical area and having traffic coordinating means for regulating the use of a single two-way radiant energy signaling channel by signal transmitters and receivers located in different sub-areas of the overall service area.

The invention may be used with advantage in various types of signaling systems. It is especially useful in a highway radio telephone system extending over a large area and employing a single two-frequency signaling channel for use by a number of transmitting and receiving stations, some of these stations being fixedly located and others being mobile. For purposes of explanation, the invention is described hereinafter with reference to its application to a system of this type.

In such a signaling system, mobile customers' stations constituted by radio telephone transmitting and receiving equipments mounted in vehicles, such as automobiles, are provided with communication service throughout a large area extending along one highway, or several neighboring highways, by means of radio telephone central offices disposed along the highway route in such a manner that each covers a small sub-area of the entire service area. In order to receive signals sent from the vehicular stations, several radio telephone receiving stations are fixedly located at strategic points in each sub-area and are connected by wire lines to the central office in their respective sub-area. In order to send signals from the central offices to the mobile stations, each central office is usually provided with only one radio telephone transmitter, although it is to be understood that a central office could be provided with additional radio transmitters if desired. The radio transmitters are fixedly located either at their respective central office buildings or at some other suitable position in their respective sub-areas. In the latter case, each transmitter would be connected to its respectively associated central office by wire lines.

Signaling throughout the system is accomplished by transmitting signal-modulated carrier waves over a single two-way radiant energy communication channel comprising a first frequency allocation for the transmission of carrier waves from the mobile stations to the fixedly located receivers and a second frequency allocation for the transmission of carrier waves from the fixedly located transmitters to the mobile stations. As this single two-wave communication channel is used by the customers at all the stations within the system in much the same manner as a conventional telephone party line, it can be understood that means should be employed for preventing the occurrence of interference when more than one transmitter at a time attempts to transmit signals over the common channel.

Interference from this source has heretofore been prevented in systems having a small service coverage area by employing lock-out means for disabling the transmitters at all of the mobile stations except the first one to seize the common channel. Although such lock-out means could be used in a system having a large service coverage area it would not permit maximum use of the common channel because there are occasions when this type of system can accommodate several calls at one time without conflict due to interference, particularly when these calls are initiated from stations located in widely separated sub-areas of the overall service area. While it is thus advantageous under some circumstances to permit the common channel to be used for two or more calls simultaneously, there are other circumstances under which the use of the channel should be restricted to only one call at a time, such as when the second calling station is located near the first calling station.

Accordingly, it is an object of this invention to provide improved traffic coordinating means for use in a radiant energy signaling system.

It is also an object of the invention to provide improved means in a radiant energy signaling system for determining which one of two or more stations that receive calling signals at the same time from the same station shall answer the call.

Another object of this invention is to provide improved means in a signaling system having a single two-way radiant energy signaling channel for transmitting more than one message simultaneously over the single channel.

Still another object of this invention is to provide improved measuring circuits at certain of the stations in a radiant energy signaling system having a single two-frequency signaling channel for separately measuring the intensity of carrier waves received over both of said signaling frequencies.

An additional object of this invention is to provide improved means at certain of the stations in a radiant energy signaling system for transmitting time-division multiplex signals indicative of the strength of carrier waves received by these stations.

A further object of the invention is to provide improved power control means in a radiant energy signaling system having a plurality of signaling stations for automatically switching certain of the stations from operation on high power to operation on low power and vice versa in accordance with the intensity of signals received at these stations.

These and other objects of the invention are accomplished in a radiant energy signaling system having a plurality of signaling stations by employing means at a first group of the stations, such as the central offices, for producing time-division multiplex signals indicative of the strength of carrier waves received from a second group of the stations, such as the customers' mobile stations. Each of the first-mentioned stations is provided with a monitoring receiver for receiving the time-division multiplex signals and for applying them to a control circuit.

At each station in the first group, these signals cause the control circuit to control the operation of the radio transmitter at that station in accordance with the intensity of the signals so that when the received mobile carrier is weak, the carrier transmitted from the associated transmitter at the respective central office will be strong and, when the received mobile carrier is strong, the carrier from the respective central office will be weak. The control circuit at each central office also prevents the transmission of carrier waves from its associated radio transmitter when strong carrier waves are received from another central office but permits the transmission of carrier waves from that central office when weak carrier waves are received from an adjacent central office. The invention further comprises various improved supervisory circuits and features at each of the central offices.

These and other features of the invention are more fully discussed in connection with the following detailed description of the drawing in which.

Figure 1:
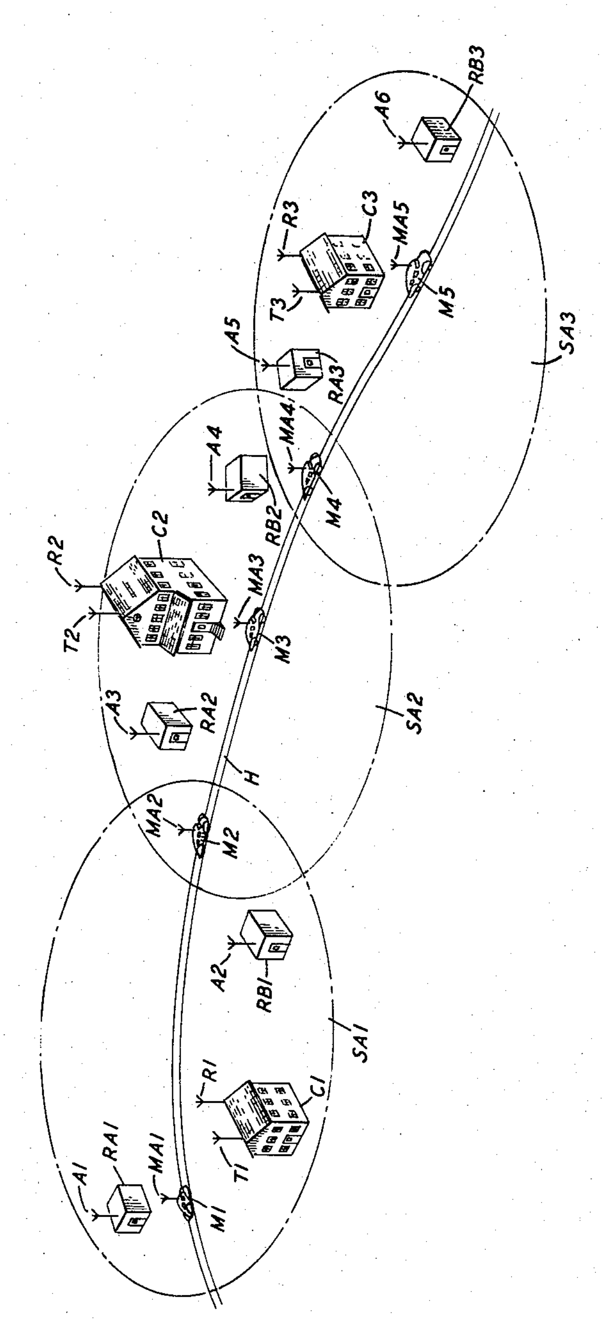
Fig. 1 is a pictorial representation of a portion of a highway radio telephone system.

The portion of the highway radio telephone system that is illustrated in Fig. 1 is shown to include a number of radio telephone central offices C1, C2, and C3 located along a highway H for providing communication service to customers traveling along the highway H in automobiles equipped with radio telephone transmitting and receiving equipments. These customers' mobile stations, which are indicated in Fig. 1 by the reference characters M1, M2, M3, M4, and M5, are each equipped with an antenna MA1, MA2, MA3, MA4, and MA5, respectively, for transmitting and receiving radiant energy signals. Preferably, but not necessarily, the radio transmitters at each of the mobile stations all operate on the same assigned fixed power value. Each of the central offices C1, C2, and C3 has a transmitting antenna T1, T2, and T3, respectively, and a receiving antenna R1, R2, and R3, respectively. As is described hereinafter, the transmitting antenna at each central office is connected to a radio telephone transmitter, and its associated receiving antenna is connected to a monitoring radio telephone receiver. It is to be understood that the highway H extends for a considerable distance both to the left and to the right of Fig. 1 and that other central offices are located along it at suitable intervals for serving other customers' mobile stations.

Each central office covers a small sub-area of the entire service area extending along the highway H. Thus, the central office C1 covers a sub-area SA1, the central office C2 serves another sub-area SA2, and the central office C3 covers a third sub-area SA3. The central office in each sub-area has one or more radio telephone receivers fixedly located within its respective sub-area for receiving signals sent from the mobile stations. Fig. 1 shows that the central office C1 has associated with it the fixedly located radio receivers RA1 and RB1, the central office C2 has the fixed receivers RA2 and RB2, and the central office C3 has the fixed receivers RA3 and RB3. Each of the fixed receivers is connected to its respectively associated central office by conventional wire lines which, for the purpose of simplicity, are not shown in Fig. 1. The fixed receivers RA1 to RB3, inclusive, are equipped with receiving antennas A1, A2, A3, A4, A5, and A6, respectively, for receiving signals from those of the mobile stations M1 to M5 that are within the receiving range of the receivers.

As was stated above, the system is assigned only one two-frequency radiant energy signaling channel for use by all of the stations. Accordingly, all of the mobile stations are designed to transmit carrier waves over one of the frequency allocations of the common signaling channel, and all of the fixedly located radio receivers are tuned to this frequency. Similarly, all of the central office radio transmitters are designed to transmit carrier waves having a mean frequency value corresponding to the other frequency allocation, and all of the mobile stations and the monitoring radio receivers at the central offices are tuned to receive carrier waves transmitted over this second frequency allocation.

Figure 2:
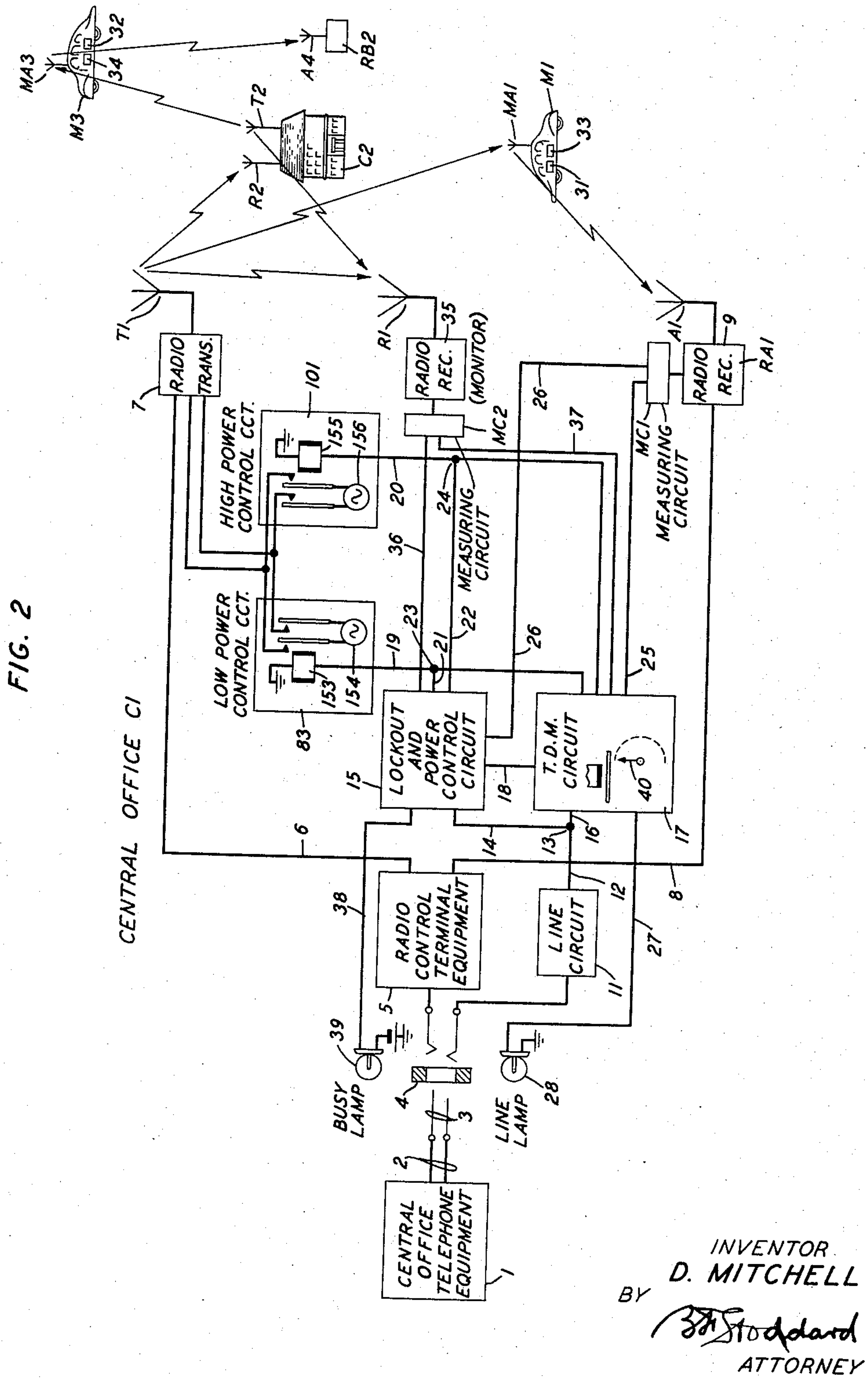
Fig. 2 is a block diagram of the equipment at one of the central offices shown in conjunction with two of the customers' mobile stations.

The central office illustrated in Fig. 2 is typical of each of the other central offices in the system and, for purposes of explanation, it may be considered as being the central office C1 indicated in Fig. 1. It is shown in Fig.

2 to comprise conventional central office telephone equipment 1 which is connectable to the radio equipment, shown at the right, by means of a cord 2, plug 3, and jack 4. The upper spring of the line jack 4 is connected to conventional radio control terminal equipment 5 having a lead 6 extending to a fixed located radio transmitter 7 and another lead 8 connected to a fixedly located radio receiver 9 which may be considered as being equivalent to the fixed receiver RA1 shown in Fig. 1. Only one fixedly located radio transmitter and one fixedly located radio receiver have been shown for the purpose of simplicity. It is to be understood that, as was stated above, the central office may, if desired, be equipped with more than one fixedly located radio transmitter and may also be provided with more than one fixedly located radio receiver, in which case they would be connected in a similar manner.

The lower spring of the line jack 4 is connected to a line circuit 11. A lead 12 extends from the line circuit 11 to a junction point 13 which is connected by a lead 14 to a lockout and power control circuit 15. Another lead 16 connects the junction point 13 to a time-division multiplex circuit 17 which has a portion of its output energy applied over a lead 18 to the lockout and power control circuit 15. The line circuit 11, the lockout and power control circuit 15, and the time-division multiplex circuit 17 are shown in detail in Fig. 4.

Output energy from the time-division multiplex circuit is applied over the leads 19 and 20 alternatively to the power supply control circuits 83 and 101 associated with the radio transmitter 7 for controlling its operation. The lockout and power control circuit 15 also controls the operation of the radio transmitter 7 by applying energy alternatively to the power supply control circuits 83 and 101 over leads 21 and 22 connected to junction points 23 and 24, respectively, on the leads 19 and 20. When energy is applied to the lead 19, it causes a relay 153 in the low power control circuit 83 to become energized. Accordingly, relay 153 operates its armatures to connect a source 154 of low power over an obvious path to the radio transmitter 7. This conditions the radio transmitter 7 for operation on low power. Similarly, if current is delivered over the lead 20 to the high power control circuit 101, a relay 155 will become energized and will operate its armatures to connect a source 156 of high power to the radio transmitter 7 for enabling it to radiate carrier waves from the antenna T1 on high power. The power supplied from the sources 154 and 156 have assigned fixed values which preferably, but not necessarily, are the same at each of the other central offices.

For explanatory purposes, Fig. 2 includes some of the stations shown in Fig. 1; namely the mobile stations M1 and M3, the central office C2, and the fixedly located radio receiver RB2. Fig. 2 indicates that each of the mobile stations M1 and M3 is provided with radio transmitting equipment 31 and 32, respectively, and radio receiving equipment 33 and 34, respectively. This portion of the system is shown to be in the condition in which more than one call is in progress simultaneously over the single signaling channel; that is, one call is being made between the central office C1 and the mobile station M1 while another call is in progress between the central office C2 and the mobile station M3. Under this condition, the monitoring radio receiver 35 at the central office C1 will receive carrier waves radiated from the antennas T1 and T2 over that one of the two frequency allocations of the single communication channel which is assigned for use by the central office radio transmitters. Similarly, the fixedly located radio receiver 9 will receive carrier waves radiated from the antenna MA1 over the other frequency allocation, this being the one that is assigned for use by the mobile radio transmitters.

When the fixedly located radio receiver 9 receives carrier waves from any of the mobile stations, such as the mobile station M1, a portion of the demodulated received energy will be applied to a measuring circuit MC1. The measuring circuit MC1 is connected by leads 25 and 26 to the time-division multiplex circuit 17 and to the lockout and power control circuit 15, respectively, for performing various functions described hereinafter, such as the lighting of a line lamp 28 over a lead 27 extending from the time-division multiplex circuit 17. A somewhat similar measuring circuit MC2 is connected to the monitoring radio receiver 35 so that, when it receives carrier waves transmitted over the frequency allocation used by the central office radio transmitters, a portion of the demodulated energy will be delivered over leads 36 and 37 to the lockout and power control circuit 15 and to the time division multiplex circuit 17, respectively. This accomplishes several purposes which are described in detail hereinafter, such as supplying energy over a lead 38, extending from the lockout and power control circuit 15, to effect the illumination of a busy lamp 39.

Referring briefly to Fig. 1, it can be understood that, if the common signaling channel is being used for a call between the central office C3 and the mobile station M5, then the system could simultaneously accommodate a call between the central office C1 and the mobile station M1 because the service sub-areas SA1 and SA3 are not adjacent and the distance between them is assumed to be sufficient to prevent conflict due to interference. It can also be understood that the placing of a call from the mobile station M5 to the central office C3 simultaneously with a call from the mobile station M3 to the central office C2 would, in general, be liable to produce interference due to the fact that the service sub-areas SA2 and SA3 are adjacent and also because the carrier waves transmitted from the central offices are ordinarily radiated at full power.

In this latter case, however, if the strength of the carriers transmitted from both of the central offices C2 and C3 is reduced sufficiently, then it would be possible for these calls to be made simultaneously without interference. Whether both of the carriers can be thus weakened without impairing the quality of their reception by their respectively associated mobile stations depends upon whether the mobile stations are near or remote from their central offices. Indications of these particular distances can be obtained by determining the strength of the mobile carriers when received at the central offices because the reception of a weak mobile carrier would indicate that its mobile station was located at a considerable distance from the central office whereas the reception of a strong mobile carrier would indicate that its mobile station was located in the vicinity of the central office.

Accordingly, the central offices are equipped with measuring circuits, similar to the measuring circuit MC1 mentioned above, which are supplied with energy by their respectively associated fixedly located radio receivers. These measuring circuits are designed to provide one type of response when weak mobile carrier is received and a different type of response when strong mobile carrier is received. The responses from these measuring circuits actuate their respectively associated high and low power supply control circuits in such a manner as to cause their respectively associated fixed transmitters to send out short pulses of carrier current constituting signals indicative of the types of the responses. Since more than one central office might receive the same call from a mobile station, as would be the case when the mobile station is located within the overlapping portion of their service sub-areas, and since they would each receive the call at substantially the same time, each central office is allotted an individually different time interval in which to transmit so that the signals are sent out on a time-division multiplex basis. These signals are received by the central office monitoring radio receivers which, in turn, apply the resulting demodulated energy to their respectively associated measuring circuits which are similar to the measuring circuit MC2 mentioned above.

The time-division multiplex signals transmitted from the central offices convey information as to whether a calling mobile station is near or far from the particular central offices, thus enabling a choice to be made as to which operator's line lamp will be lighted, only one such lamp being lighted for any one call. Through the intermediary action of the measuring circuits, the signals also control the operation of the lockout and power control circuit at each central office which is designed to exercise its lockout function on its associated radio transmitter so as to prevent it from transmitting when a central office transmitter in an adjacent area is operating on high power. Each lockout and power control circuit is further designed to restrict its associated transmitter to operation on low power when its associated calling mobile station is near and also when a central office transmitter in an adjacent area is operating on low power. When none of these conditions apply, the central office transmitter is permitted to operate on high power.

Figure 3:
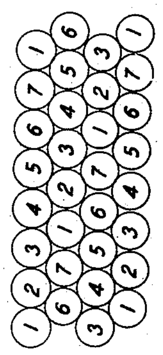
Fig. 3 is a schematic representation of a geographical layout of the time allocations for the transmission of time-division multiplex signals from the central offices.

In Fig. 3, which shows a geographical layout of the central office time allocations, each circle represents one sub-area of the entire service area of the system and the numeral within each circle indicates the order of the time allotment for the respective sub-area. It can be understood that, in order to avoid confusion between the central office signals, the central office in each sub-area should be given a time allocation which is distinct from the time allocations assigned to central offices in adjacent sub-areas. Also, in order to prevent signals from one central office overlapping with signals from an adjacent central office, it is evident that there should be no duplication of time allocations for sub-areas surrounding any one sub-area. An inspection of Fig. 3 will show that, by using only seven time allocations, it is possible to arrange a pattern in which the time allocations of the sub-areas around any given sub-area are never duplicated.

The manner in which this traffic coordinating system operates will now be briefly described with reference again to Fig. 2. Assuming that the mobile station M1 initiates a call, the calling signal will be received by the radio receiver 9, for example, and will be applied over the lead 25 to the time-division multiplex circuit 17 and also over the lead 26 to the lockout and power control circuit 15. The time-division multiplex circuit 17 includes a time switch 40 which is somewhat similar to a telegraph start-stop distributor. This time switch 40 begins operation in response to the reception of the calling signal and, at the assigned time interval, applies energy over one of the leads 19 and 20 to the radio transmitter 7 for causing it to transmit a pulse of carrier current. As was stated above, if the level of the received calling signal is low, a strong carrier pulse will be transmitted; whereas, if the received calling signal has a high level, then a weak carrier pulse will be transmitted. If the same call is received by more than one central office, each will transmit a carrier pulse during its assigned time interval.

The monotoring measuring circuit at only the first central office on the assigned time numbering plan to receive a strong calling signal will cause its associated line lamp to light. In the event that none of the central offices receives a strong calling signal, the measuring circuit at only the first central office on the time numbering plan to receive a weak calling signal will cause its associated line lamp to light. In either case, this particular calling signal will not effect the lighting of the line lamp at any other central office.

The lighting of the line lamp serves to call the operator at that particular central office. When the operator answers the call, the answering central office transmitter continues to radiate carrier at the same power level as it did during the pulsing period. The central office carrier will be radiated at this power level until the termination of the call except that, when strong carrier is transmitted from the central office in response to a weak calling signal, its level will be reduced if the mobile station later moves into the vicinity of the central office.

Assuming that the system is idle at the time when a central office operator initiates a call, then the central office transmitter will radiate carrier current at high power. If the called mobile station is distant, as would be indicated by a weak response, the central office carrier will continue to be radiated at high power. However, if the response from the called mobile station is strong, thereby indicating that it is near, the power of the central office carrier will be reduced to a low level.

If the system is busy with another call when a central office operator attempts to initiate a call, then the monitoring measuring circuit at the calling central office will, in the event that strong carrier current is being received, cause the illumination of the busy lamp at the calling central office and will also effect the operation of its associated lockout circuit so as to prevent the central office from either initiating or receiving a call. However, if the measuring circuit at the calling central office is receiving weak carrier current from another central office, it will permit the initiation or reception of a call but only on low power as is described in more detail hereinafter.

Figure 4:
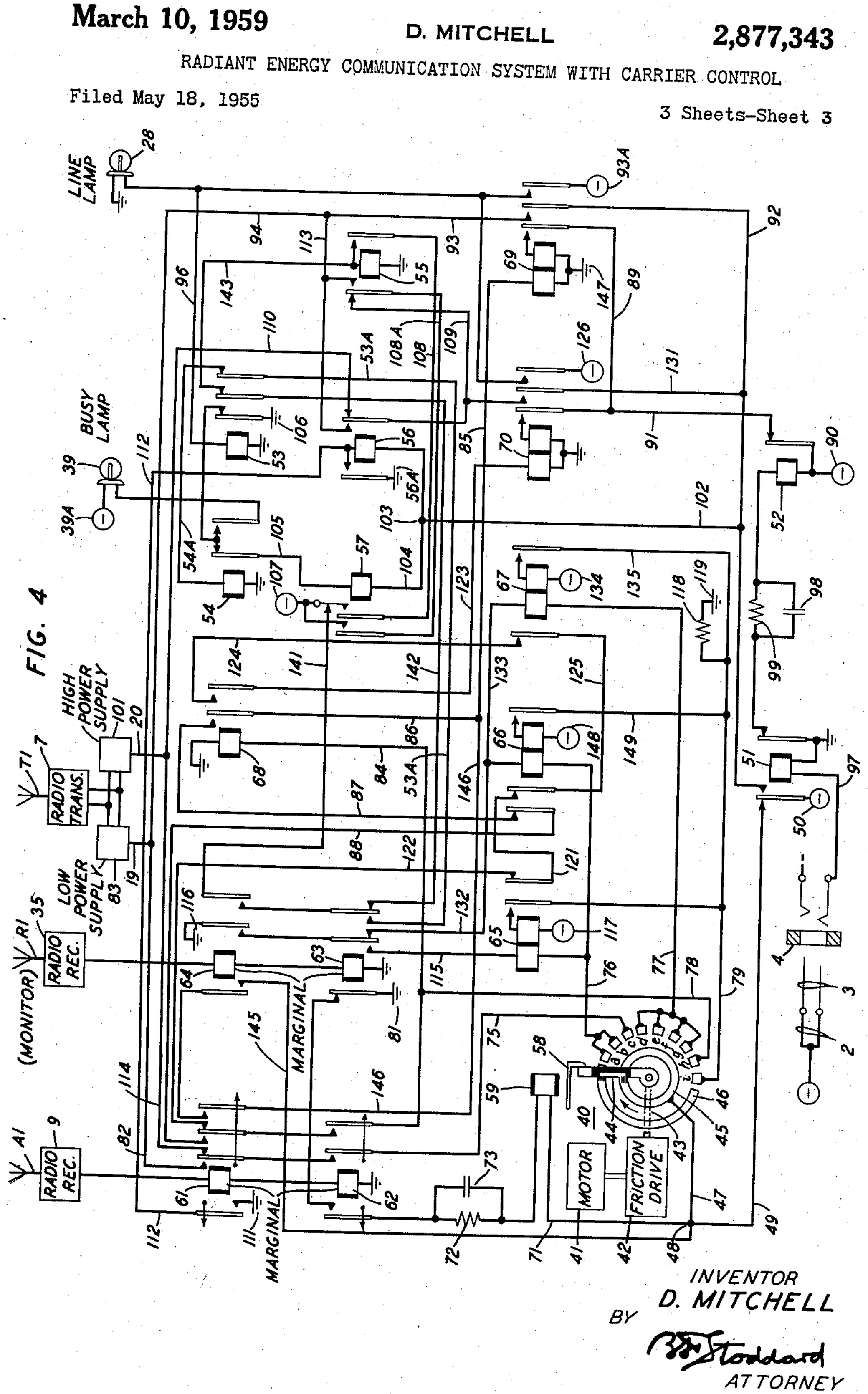
Fig. 4 is a detailed circuit diagram of the equipment at a central office.

Fig. 4 shows circuit means for performing the above-mentioned functions at a central office which is typical of each of the other central offices in this system and which, for purposes of illustration, may be considered as being the central office C1 indicated in Fig. 1 and represented in block diagram form in Fig. 2. Where convenient, some of the portions of the circuit of Fig. 4 which are similar to those of Fig. 2 are indicated by the same reference numerals. In Fig. 4, the relays 51 and 52 are part of the line circuit indicated by the reference numeral 11 in Fig. 2. The lockout and power control circuit 15 of Fig. 2 is shown in Fig. 4 to include the relays 53, 54, 55, 56 and 57. The fixedly located radio receiver 9 is provided with a measuring circuit which comprises two marginal relays 61 and 62. Similarly, the monitoring radio receiver 35 has a measuring circuit which includes two marginal relays 63 and 64. The time-division multiplex circuit 17 of Fig. 2 is shown in Fig. 4 as comprising the time switch 40 and the relays 65, 66, 67, 68, 69 and 70.

As was stated above, the time switch 40 is of the start-stop type and is somewhat similar to a telegraph start-stop distributor. It includes a motor 41 which operates a friction drive device 42 of any suitable design. The device 42 drives a shaft 43 which, in turn, rotates a brush arm 44. The brush arm 44 is equipped with two brushes so adapted that one sweeps over a solid inner commutator ring 45 and the other sweeps over an outer commutator ring 46 provided with nine segments. The inner ring is connected by a lead 47 to a junction point 48 and then over a lead 49 and the released left armature of relay 51 to a source 50 of electric current.

The manner in which the nine segments of the outer distributor ring 46 are variously connected will now be described assuming for purposes of explanation that the central office of Fig. 4 is number three in the assigned time numbering plan. Accordingly, segment *c* of the outer distributor ring 46 is connected to a lead 75 for applying electric energy from the source 50 to an armature of relay 62 for activating alternatively the power supply circuits 83 and 101 of the radio transmitter 7. The first two segments *a* and *b* of the ring 46 are both connected to a lead 76 in order to establish priority for those central offices that are assigned lower numbers on the time numbering plan. Segments *d*, *e*, *f*, and *g* of the ring 46 are all connected to a lead 77 to allow a central office, which has received a strong mobile carrier, to transmit a weak carrier from its fixedly located radio transmitter and thus assume priority when the central office of Fig. 4 receives a weak mobile carrier. Segments *h* and *i* of the ring 46 are connected respectively to the leads 78 and 79 for reasons that are explained hereinafter.

When no calls are being received, the brush arm 44 is prevented from rotating by a detent 58 on the armature of a release relay 59 which, at this time, is not energized. This is due to the fact that the circuit for energizing relay 59 extends from the source 50, along the lead 49 to the junction point 48, along a lead 71, through the winding of relay 59, through a resistor 72 having a condenser 73 connected across it, and then to the left armature of relay 62 which is in its released position at this time. It should be noted that the release relay 59 cannot be energized whenever the plug 3 is in the jack 4 because this applies current over the lower portion of line 2 to the winding of relay 51 which thereupon becomes energized and operates its armatures with its left armature disconnecting the source 50 from the lead 49 extending to the winding of relay 59.

When a call from a mobile station is received by the radio receiver 9, a portion of the demodulated energy will be applied to the windings of the marginal relays 61 and 62 in its associated measuring circuit. These marginal relays 61 and 62 are so designed that relatively weak electric energy will effect the operation of the armatures of relay 62; whereas, relay 61 requires the application of much stronger electric energy for the operation of its armatures. Thus, if the calling vehicle is distant from this central office, then the level of its received carrier will be so low that only the armatures of relay 62 will become operated. However, if the calling vehicle is in the vicinity of the central office, then its carrier will be received with such strong intensity as to effect the operation of the armatures of both relays 61 and 62.

At this point, it should be stated that the marginal relays 63 and 64 in the measuring circuit associated with the monitoring radio receiver 35 also have different sensitivities but are oppositely arranged. Specifically, relay 63 is designed to operate its armatures only when strong carrier energy is received by the monitoring radio receiver 35. Relay 64 is like relay 62 in that it is designed to operate its armatures not only in response to the reception of strong carrier waves but also when weak carrier waves are received.

The operation of this traffic coordinating system will now be described from the standpoint of its response to various typical calls. The first call to be described will be assumed to have been initiated from a near mobile station at a time when all the other stations are idle. Due to the calling vehicle being near, its carrier waves will arrive with high intensity at the radio receiver 9 and will therefore effect the operation of the armatures of both relays 61 and 62. The operation of the left armature of relay 62 connects the resistor 72 and condenser 73 over the outer released armature of relay 63 to ground 81. The condenser 73 now acquires a charge from the source 50 thereby effecting the operation of the armature of the release relay 59. Since the resistor 72 is designed to be quite large, it serves to gradually discharge the condenser 73 after this first operation.

When the release relay 59 operates its armature, the detent 58 is pulled up to permit the brush arm 44 to rotate. Upon reaching segment *c* of the outer distributor ring 46, the brush arm 44 closes a path extending from the source 50, along the leads 49 and 47 over the brush arm 44 to segment *c*, along lead 75, over the operated inner right armatures of relays 62 and 61, and then along leads 82 and 19 to the low power supply circuit 83 of the radio transmitter 7. This causes the radio transmitter 7 to radiate briefly weak carrier current constituting a time-division multiplex signal having the third position in the above-mentioned time numbering plan.

Since the transmission of this weak carrier current is stopped when the brush arm 44 moves to the next segment of the distributor ring 46, the signal will actually be a short pulse of carrier current. It should be noted that relays 61 and 62 are of the slow-to-release type and are so designed as to hold their armatures operated for a length of time sufficient to permit the brush arm 44 to complete one cycle of rotation.

It was assumed above that all other stations were idle when this call was initiated. However, it should be mentioned that, if the system should be busy due to the fact that a central office in an adjacent area was at this time transmitting strong carrier waves, the reception of these waves by the monitoring receiver 35 would effect the operation of the armatures of both relays 63 and 64. This closes a path from a source 107 of electric current, along a lead 141, over the operated outer right armatures of relays 64 and 63, along a lead 53A, over the released outer armature of relay 53, and then along a lead 54A to the winding of relay 54. Relay 54 now operates its armatures with its inner armature opening the energizing circuit of relay 57. The operation of the outer armature of relay 54 closes a path for current to flow from the source 39A, through the busy lamp 39, over the operated outer armature of relay 54, and then over the released inner armature of relay 53 to ground 106. Consequently, the busy lamp 39 becomes illuminated to provide the operator with a visible signal.

The operation of the left armature of relay 63 would disconnect ground 81 from the energizing circuit of the release relay 59. Under this condition, the release relay 59 would not be able to operate its armature and the brush arm 44 would be held from rotating. Consequently, the radio transmitter 7 would be prevented from transmitting carrier waves in accordance with the principle set forth above to the effect that, in this single channel system, a central office should be prevented from transmitting when a central office in an adjacent area is transmitting strong carrier waves.

Returning now to the call being described, if this call from the mobile station is received with low intensity at any of the central offices having the fourth to seventh, inclusive, positions in the time numbering plan, their relays corresponding to relay 62 will operate their armatures to start the rotation of their distributor brush arms. At each of these central offices, a circuit will now be closed similar to a path extending from the source 50, along leads 49 and 47, through the distributor to lead 75, over the operated inner right armature of relay 62, over the released inner right armature of relay 61, and then along leads 114 and 120 to the high power supply 101. This will cause the radio transmitters at these central offices to transmit strong time-division multiplex signals.

The reception of these high-level signals by the monitoring radio receiver 35 will cause relays 63 and 64 to operate their armatures. The operation of the left armature of relay 63 will disconnect ground 81 from the energizing circuit of the release relay 59, as was described above. However, this does not produce any useful effect at the central office of Fig. 4 at this time because this central office has an earlier position in the time numbering plan and has already sent out its time-division multiplex signal.

During the eighth time interval, the brush arm 44 applies electric energy from the source 50 to segment *h* which is connected by the leads 78 and 84 to the winding of relay 68. This causes relay 68 to operate its armatures thereby closing a path from the left winding of relay 69, along leads 85 and 86, over the operated inner armature of relay 68, along lead 87, over the released outer left armature of relay 66, along lead 88, over the operated middle right armature of relay 61, over the operated outer right armature of relay 62, along lead 78 to segment *h*, and then over the brush arm 44 to the source 50.

Relay 69 now operates its armatures and locks up over its right winding and operated inner armature, along leads 89 and 91, and then over the released armature of relay 52 to a source 90 of electric energy. The operation of the middle armature of relay 69 prepares a circuit extending from the left make contact of relay 51, along a lead 92, and then along leads 93, 94, and 19 to the low power control circuit 83 of the radio transmitter 7. At this time, the operation of the outer armature of relay 69 connects a source 93A of electric energy over an obvious path to illuminate the line lamp 28. The source 93A is also connected over a lead 96 to the winding of relay 53. Relay 53 accordingly operates its armatures to disable the lockout and power control circuit 15 so that the control conditions which have now been established will not be disturbed by another incoming call but will remain in effect until the termination of the present call.

Upon noticing the lighting of the line lamp 28, the operator at the central office of Fig. 4 now answers the call by inserting the plug 3 in the line jack 4. This applies electric energy over the lower conductor of the line 2 and along a lead 97 to the winding of relay 51 which thereupon operates its armatures. The operation of its left armature transfers the source 50 from its break contact to its make contact which, as was stated above, is now connected by the leads 92, 93, 94 and 19 to the low power control circuit 83 of the radio transmitter 7. The radio transmitter 7 is thus placed in condition for operation on low power. It should be noted that, when the left armature of relay 51 moved away from its break contact, it disconnected the source 50 from the energizing circuit of the release relay 59 thus preventing relay 59 from becoming energized by signals received from the vehicular station during the progress of the call.

At the conclusion of the call, the central office operator removes the plug 3 from the jack 4. This deenergizes relay 51 and causes it to release its armatures. The engagement of the right armature of relay 51 with its break contact at this time allows a condenser 98, which is connected across a large resistor 99, to charge. This briefly energizes relay 52 and causes it to operate its armature momentarily. It should be mentioned at this point that the resistor 99 is designed to have such high resistivity that it will limit the current flowing through it to a value less than that required for causing relay 52 to operate its armatures. The resistor 99 also serves to gradually discharge the condenser 98 in order to prepare relay 52 for momentary operation upon the release of the right armature of relay 51.

The operation of the armature of relay 52 opens the locking circuit of relay 69 for a length of time sufficient for it to release its armatures. The release of the outer armature of relay 69 disconnects the source 93A from the line lamp 28 and the relay 53. The line lamp 28 now becomes extinguished and relay 53 releases its armatures to restore the lockout and power control circuit 15 to its operative condition. The system is thus restored to its normal idle condition.

As was stated above, if the system is idle when the central office operator initiates a call to a vehicular station, then the radio transmitter 7 will be operated by its high power supply circuit 101 in a manner that will now be described. When the operator inserts the plug 3 in the jack 4, relay 51 is energized, as was explained above, and operates its armatures. The movement of its left armature away from its break contact serves to disable the distributor time switch 40 by disconnecting the source 50 from the energizing circuit of the release relay 59 so as to prevent it from becoming energized when the vehicular station answers the call.

The left armature of relay 51 now moves into engagement with its make contact thereby applying electric energy from the source 50 to a path extending along a lead 102 to a junction point 103, along lead 104, through the winding of relay 57, along lead 105, over the released inner armature of relay 54, and then over the released inner armature of relay 53 to ground 106. Relay 57 accordingly operates its armatures to apply current from the source 107 to a path extending over its outer armature, along the lead 108A over the released left armature of relay 55, along lead 109, over the released right armature of relay 56, and then along leads 110 and 20 to the high power control circuit 101 of the radio transmitter 7. This conditions the radio transmitter 7 for operation on high power.

If the called mobile station is near, its answering carrier will be received with sufficiently high intensity to effect the energization of both relays 61 and 62. The operation of the left armature of relay 61 connects ground 111 to a lead 112 extending to one side of the winding of relay 56. Since the other side of this winding is connected at this time over the lead 102 and the operated left armature of relay 51 to the source 50, relay 56 becomes energized and operates its armatures. The movement of its right armature away from its break contact disconnects the source 107 from the lead 110 thereby disabling the high power control circuit 101.

The resulting engagement of the right armature of relay 56 with its make contact connects the source 107 over leads 113, 94, and 19 to the low power control circuit 83 so that the radio transmitter 7 will now operate with low power. The operation of the left armature of relay 56 completes a locking path for relay 56 extending from the source 50, over the operated left armature of relay 51, along lead 102, through the winding of relay 56, and then over its operated left armature to ground 56A. The radio transmitter 7 will thus remain locked for operation on low power until the termination of the call.

At the end of the call, the operator will remove the plug 3 from the jack 4 thereby de-energizing relay 51 and causing it to release its armatures. The release of the left armature of relay 51 opens the locking circuit of relay 56 and also opens the energizing circuit of relay 57. Relays 56 and 57 now release their armatures thereby restoring the central office circuits to the condition shown in Fig. 4.

If, when the call is initiated by the central office operator, the called mobile station is distant, then its answering carrier will be weak when it is received by the radio receiver 9. Consequently, only relay 62 in the measuring circuit at the central office will be energized and relay 61 will remain unenergized. This permits the radio transmitter 7 to continue to operate on the same high power that was used for initiating the call from this central office. However, if, during the course of the call, the vehicular station should move near to the central office, then its carrier will be received with sufficiently high intensity to effect the energization of relay 61 in addition to the previously energized relay 62. Relay 61 will accordingly operate its armatures and its left armature will now initiate the sequence of operations explained above for effecting the switching of the radio transmitter 7 to operation on low power. When this occurs, the radio transmitter 7 will remain locked for operation on low power, as described above, until the end of the call.

Assuming now that, when the system is in an idle condition, a mobile station initiates a call at a time when it is distant from the central office of Fig. 4 and is also distant from central offices having both earlier and later positions in the time numbering plan. Specifically, let it be assumed that the calling mobile carrier is weakly received at central offices having positions 1, 3, 5 and 6 in the time numbering plan. At each of these central offices, the weak mobile carrier will not energize relay 61 but will cause relay 62 to operate its armatures to effect the release of the brush arm 44 in the manner described above.

When the brush arm 44 at each of these central offices sweeps over that one of the segments of the ring 46 which corresponds to the position its respective central office has in the time numbering plan, current from the source 50 will be applied to a path extending along lead 75, over the operated inner right armature of relay 62, over the released inner right armature and break contact of relay 61, and then along a lead 114 and the lead 20 to the high power control circuit 101. Thus, each of these central offices will transmit a time-division multiplex pulse of strong carrier current during their respectively assigned time intervals.

These pulses will be received by the monitoring radio receivers 35 at each of these central offices and the resulting demodulated energy will be applied to the marginal relays 63 and 64 in their responsive measuring circuits. At the central office of Fig. 4, for example, the strong carrier pulse received during the first time interval will effect the energization of both relays 63 and 64. The operation of the outer right armatures of relays 63 and 64 closes the path described above for lighting the busy lamp 39.

At the same time, a path is closed for current to flow from the source 50, over the brush arm 44 to segment *a* of ring 46, along lead 76, through the left winding of relay 65, along lead 115, and then over the operated inner right armatures of relays 63 and 64 to ground 116. Relay 65 now operates its armatures and locks up from a source 117 of electric energy, over its inner armature, and then through a resistor 118 to ground 119. The operation of the outer armature of relay 65 disconnects a lead 121 from lead 122 thereby opening the energizing circuit of relay 70 so that it will not become energized during the eighth time interval because this would signal the operator by lighting the line lamp 28 as will now be described.

During the eighth time interval, relay 68 is caused to operate its armatures as was explained above. If the armatures of relay 65 were not operated at this time, relay 70 would now become energized over a path extending from the left winding of relay 70, along lead 123, over the operated outer armature of relay 68, along lead 124, over the released left armature of relay 67, along lead 125, over the released inner left armature of relay 66, along leads 121 and 122, over the released middle right armature of relay 61, over the operated outer right armature of relay 62, along lead 78, and then over segment *h* and the brush arm 44 to the source 50. The resulting operation of the armatures of relay 70 would have applied current from the source 126 over its outer armature to the line lamp 28 to provide the operator with a visible signal. However, since the leads 121 and 122 are actually disconnected by the operation of the outer armature of the relay 65 at the central offices having the third, fifth and sixth time positions, their relays 70 will not be energized at this time and their line lamp 28 will not be illuminated.

During the ninth time interval, current from the source 50 is applied over the brush arm 44 to segment *i* of the ring 46 and then along the lead 79 to the resistor 118. This effectively short-circuits the locking winding of relay 65 which thereupon releases its armatures.

It is to be particularly noted that the central office which is assigned the first time position has the segment *a* of its ring 46 connected to a lead corresponding to the lead 75 in Fig. 4 and that its segments *b* and *c* are connected to a lead corresponding to the lead 77 in Fig. 4. Furthermore, at this central office, the lead 76 and relay 65 of Fig. 4 are eliminated because these are provided only at the other central offices for establishing priority for central offices that are assigned lower numbers in the time numbering plan. Therefore, the leads 121 and 122 at this first central office will not be disconnected in response to this call. Consequently, during the eighth time interval, the relay 70 at this central office will become energized in the manner described above.

The resulting operation of the armatures of the relay 70 at this central office will close a locking path extending over its inner armature, along lead 91, and then over the released armature of relay 52 to the source 90. The operation of its outer armature will apply current from the source 126 over an obvious path to effect the illumination of the line lamp 28. Thus, this central office will be the only one to have its line lamp 28 illuminated in response to this call.

The operator at this central office answers the call by inserting the plug 3 into the line jack 4 to effect the energization of relay 51 in the manner described above. Current from the source 50 is now applied to a path extending along a lead 131, over the operated middle armature of relay 70, over the released right armature of relay 56, and then along leads 110 and 20 to the high power supply circuit 101. The call now proceeds with the radio transmitter 7 operating at high power.

At the termination of the call, the operator withdraws the plug 3 from the jack 4 thereby permitting the condenser 98 to charge and to thereby effect a momentary energization of relay 52 as was described above. This results in a momentary operation of the armature of relay 52 thereby opening the locking circuit of relay 70 for a sufficient length of time for it to release its armatures. The release of the outer armature of relay 70 opens the illuminating circuit of the line lamp 28, thus restoring the system to its normal idle condition.

As the next example, let it be assumed that a mobile station initiates a call at a time when it is distant from the central office of Fig. 4 but is near a central office having a later position in the time numbering plan, such as the central office having the sixth time position. Let it further be assumed that the calling vehicle is also distant from another later numbered central office such as the central office having the fifth time position. Accordingly, the calling mobile carrier will be so weakly received at the third and fifth central offices that only their relays 62 will be energized but it will be received with such high intensity at the sixth central office that it will energize both its relays 61 and 62. In the third and fifth time intervals, the radio transmitters 7 at the third and fifth central offices will transmit time-division multiplex pulses of strong carrier current which will effect the energization of both relays 63 and 64 in the measuring circuits associated with the central offices monitoring radio receivers 35.

It is to be noted that the central office which is assigned the sixth time position has its segment *f* of the ring 46 connected to a lead corresponding to the lead 75 in Fig. 4. Consequently, during the sixth time interval, a path will be closed at the sixth central office for current from the source 50 to flow along the lead 75, over the operated inner right armatures of relays 61 and 62, and then along the leads 82 and 19 to the low power control circuit 83 thereby causing the radio transmitter 7 to send out a pulse of weak carrier. This will effect the energization of only the relays 64 at the central offices.

At the central office of Fig. 4, the operation of the inner right armature of relay 64 closes a path from ground 116, over the released inner right armature of relay 63 along leads 132 and 133, through the left winding of relay 67, along lead 77 to segment *f* of ring 46, and then over the brush arm 44 to the source 50. Relay 67 now operates its armatures with its right armature closing a locking circuit extending from a source 134 of electric current, along a lead 135, and then through the resistor 118 to ground 119. The operation of the left armature of relay 67 disconnects the lead 124 from the lead 125. In the eighth time interval, relay 68 will operate its armatures as described above. However, due to the fact that lead 124 is now disconnected from lead 125, relay 70 will not be energized and the line lamp 28 will not be illuminated at the central office of Fig. 4. A similar condition will exist at this time at the fifth central office.

Since segment *f* at the sixth central office is connected to the lead 75 instead of to the lead 77 as was explained above, the relay 67 at the sixth central office will not be energized in response to this call. Accordingly, during the eighth time interval, the relay 70 at this central office will become energized in the manner described above to effect the illumination of its associated line lamp 28. As this is the only line lamp that is illuminated in response to this call, priority for answering the call is thus established for the operator at the sixth central office.

It was stated above that one of the objects of this traffic coordinating system is to enable the single communication channel to be used for more than one call simultaneously under certain favorable conditions. The manner in which this is accomplished will now be described by assuming that an operator at the central office of Fig. 4 wishes to initiate a call to a mobile station at the same time that a radio transmitter at an adjacent central office is transmitting on low power. In this instance, the relay 64 in the measuring circuit associated with the monitoring receiver 35 will be energized by the weak carrier transmitted from the other central office.

Consequently, before the operator inserts the plug 3 in the jack 4, a path will have been closed from the source 107, along the lead 141, over the operated outer right armature of relay 64, over the released outer right armature of relay 63, along lead 142, over the released middle armature of relay 53, and then along a lead 143 to the grounded winding of relay 55. The resulting operation of the right armature of relay 55 closes a portion of a circuit for locking this relay. The operation of the left armature of relay 55 disconnects the power lead 108A from the lead 109 extending to the high power control circuit 101 and transfers it instead to the lead 113 which is connected to the low power control circuit 83. Since relay 63 is not energized at this time, the busy lamp 39 is not illuminated.

When the operator at the central office of Fig. 4 inserts the plug 3 into the jack 4, relay 51 becomes energized and operates its armatures with its left armature applying current from the source 50 to the lead 102, along lead 104, through the winding of relay 57, along lead 105, and then over the released armatures of relay 54 and 53 to ground 106. This energizes relay 57 which operates its armature to apply current from the source 107 to the lead 108A, over the operated left armature of relay 55, and then along leads 113 and 94 to the low power control circuit 83 thus conditioning the radio transmitter 7 for operation on low power. Current from the source 107 is also applied over the lead 108 and the operated right armature of relay 55 to lock relay 55 in its energized condition.

Accordingly, the radio transmitter 7 will continue to operate on low power until the call is terminated by the withdrawal of the plug 3 from the jack 4. This will cause relay 51 to release its armatures which, in turn, will cause relay 57 to release its armature. The source 107 will now be disconnected from the lead 108 thereby unlocking relay 55. The resulting release of the armatures of relay 55 restores the circuits at the central office to the condition shown in Fig. 4.

The operation of this traffic coordinating system will now be described with respect to the manner in which it functions when the central office of Fig. 4 receives a call from a mobile station which is near at the same time that signals from an adjacent central office are being transmitted on low power over the common signaling channel. Before the customer at the mobile station initiates the call, the weak carrier from the other central office will have energized the relay 64 at the central office of Fig. 4 with the result that the relay 55 will also have become energized as described above. Since the calling mobile station is near the central office of Fig. 4, its carrier will be received by the radio receiver 9 with sufficient intensity to effect the energization of both relays 61 and 62.

When relay 61 operates its armatures, a path is closed for electric current to flow from the source 50, over the released left armature of relay 51, along leads 49 and 145, over the operated left armature of relay 64, over the operated outer right armature of relay 61, along leads 146 and 85, and then through the left winding of relay 69 to ground 147. Relay 69 now operates its armatures and locks up over a path extending from its right winding, over its operated inner armature, along leads 89 and 91, and then over the released armature of relay 52 to the source 90. The operation of the middle armature of relay 69 connects the lead 93 from the low power control circuit 83 to the lead 92 which is connected to the left make contact of relay 51. The operation of the outer armature of relay 69 applies current from the source 93A over an obvious path to illuminate the line lamp 28 and also along lead 96 to energize relay 53.

Relay 53 accordingly operates its armatures with its inner armature disconnecting ground 106 from the energizing circuit of relay 57, its outer armature opening the energizing circuit of relay 54, and its middle armature opening the energizing circuit of relay 55. Relay 55 now releases its armatures thereby opening its locking circuit and also transferring the lead 108A from the lead 113 to the lead 109.

When relay 62 operates its armatures, its left armature closes the path described above for energizing the release relay 59. The resulting operation of the armature of the release relay 59 releases the brush arm 44 for rotation. Assuming that the central office having the first position in the time numbering plan does not receive the calling carrier from this mobile station, the relay 63 will not be energized during the first time interval. Since relay 64 is held energized, as explained above, a path will be closed during the first time interval for current from the source 50 to flow over the brush arm 44 to segment *a* of ring 46, along lead 76, through the left winding of relay 66, along lead 132, over the released inner right armature of relay 63, and then over the operated inner right armature of relay 64 to ground 116.

Relay 66 now operates its armatures and locks up from the source 148 of electric energy, over its operated right armature, along lead 149, and then through the resistor 118 to ground 119. The operation of the outer left armature of relay 66 disconnects the lead 88 from the lead 87 to open a portion of one of the energizing circuits of relay 69. This has no effect, however, due to the fact that relay 69 is energized at this time over another of its energizing circuits as explained above.

The operation of the inner left armature of relay 66 disconnects the lead 121 from the lead 125 thereby opening the energizing circuit of relay 70 so that it cannot render the high power control circuit 101 operative. Thus, if the central office having the second position in the time numbering plan should receive the calling mobile carrier weakly, relay 65 would become energized during the second time interval and would lock up over its inner armature and resistor 118 to ground 119. The resulting operation of the outer armature of relay 65 would disconnect the lead 121 from the lead 122 to open another portion of the energizing circuit of relay 70. However, this would produce no useful result because this circuit has already been opened by the operation of the inner left armature of relay 66.

During the third time interval, current from the source 50 is applied over the brush arm 44 to segment *c*, along lead 75, over the operated inner right armatures of relays 62 and 61, and then along leads 82 and 19 to the low power control circuit 83 of the radio transmitter 7.

In the fourth time interval, current from the source 50 is supplied over the lead 77, through the left winding of relay 67, along leads 133 and 132, over the released inner right armature of relay 63, and then over the operated inner right armature of relay 64 to ground 116. Relay 67 operates its armatures and locks up over the lead 135 and resistor 118 to ground 119. The operation of the left armature of relay 67 disconnects the lead 124 from the lead 125 but this has no effect because the lead 125 has previously been disconnected from the lead 121 due to the energization of relay 66.

As was described above, during the eighth time interval, relay 68 becomes energized and operates its armatures with its inner armature closing a portion of a circuit for energizing relay 69. This has no effect at this time, however, because relay 69 has already been energized and also because the leads 87 and 88 have been previously disconnected by the operation of the outer left armature of relay 66.

In the ninth time interval, current from the source 50 is applied along the lead 79 to short-circuit the locking windings of relays 65, 66, and 67 which thereupon release their armatures.

The operator at the central office of Fig. 4 now answers the call by inserting the plug 3 in the jack 4 to effect the energization of relay 51 which applies current from the source 50 over the leads 92, 93, 94, and 19 to the low power control circuit 83 of the radio transmitter 7. Thus, by means of this traffic coordinating system, the single communication channel can be used for two calls from two different central offices simultaneously.

What is claimed is:

1. A radiant energy communication system comprising in combination a plurality of fixedly located radiant energy signaling stations and a plurality of mobile radiant energy signaling stations, all of said stations having transmitting means and receiving means for transmitting and receiving carrier waves, each of said fixedly located stations having means for producing and transmitting a time-division multiplex signal indicative of the received strength of carrier energy received from a mobile station, each of said fixedly located stations having a time switch for restricting the transmission of each time-division multiplex signal therefrom to a fixed time period in a fixed sequential time allocation order, said time period being different from the time periods allotted to the adjoining fixedly located stations, additional receiving means at each of said fixedly located stations for receiving said time-division multiplex signals, and a control circuit at each of said fixedly located stations for controlling the power level of its associated carrier transmitting means in accordance with the order of intensity of said received mobile carrier energy as represented by said received time-division multiplex signals.

2. A radiant energy signaling system having a single two-way radiant energy signaling channel constituted by first and second frequency allocations for the transmission of carrier waves, said system comprising in combination a first signaling station having first transmitting means for transmitting signals over said first carrier frequency allocation, first receiving means at said first station tuned to receive signals transmitted over said second carrier frequency allocation, a second signaling station having second transmitting means for transmitting signals over said second carrier frequency, second receiving means at said second station tuned to receive signals transmitted over said first carrier frequency, answering means at said second station for activating said second transmitting means in response to the reception at said second station of carrier waves transmitted from said first station, said answering means comprising measuring means at said second station for measuring the level of carrier signals received by said second receiving means and for providing a first type of response when the level of said measured signals is low and a second type of response when the level of said measured signals is high, said second station having a low power supply source and a high power supply source, first control means at said second station for utilizing said high power supply source for operating said second transmitting means, said first control means being actuated by said first type of response, and second control means at said second station for utilizing said low power supply source for operating said second transmitting means, said second control means being actuated by said second type of response both said first and second control means being responsive to the recognition by said measuring means of an absence of carrier waves of said first carrier frequency for terminating the utilization by said second transmitting means of said low power supply source and said high power supply source.

3. A system in accordance with claim 2 wherein said second station includes calling means for initiating a call from said second station to said first station, said calling means comprising third control means for utilizing said high power supply source for operating said second transmitting means, and fourth control means for superseding the operation of said third control means and for switching the operation of said second transmitting means from utilizing said high power supply source to utilizing said low power supply source, said fourth control means being actuated by said second type of response made by said measuring circuit.

4. A radiant energy signaling system having a single two-way radiant energy signaling channel constituted by first and second frequency allocations for the transmission of carrier waves, said system including in combination a first group of signaling stations each having transmitting means for transmitting calling signals and message signals over said first carrier frequency allocation and receiving means for receiving signals transmitted over said second carrier frequency allocation, a second group of signaling stations each having transmitting means for transmitting signals over said second carrier frequency and receiving means for receiving signals transmitted over said first carrier frequency, and traffic coordinating means for determining which of two or more stations in said second group that simultaneously receive the same calling signal from a station in the first group shall answer the call, said traffic coordinating means comprising time-division multiplex means at each station in said second group for causing its respectively associated transmitting means to transmit a special signal indicative of the strength of the calling signal received by its respectively associated receiving means, additional receiving means at each station in said second group tuned to receive said special signals, measuring means at each station in said second group for measuring the level of said special signals received by said additional receiving means, and control means operating in combination with said measuring means and said time-division multiplex means for selectively conditioning the transmitting means at only one of said stations in said second group for answering said call.

5. A radiant energy signaling system having a single two-way radiant energy signaling channel constituted by first and second frequency allocations for the transmission of carrier waves, said system including in combination a first group of signaling stations each having first transmitting means for transmitting signals over said first carrier frequency allocation and first receiving means for receiving signals transmitted over said second carrier allocation, a second group of signaling stations each having second transmitting means for transmitting signals over said second carrier frequency, each station in said second group also having second receiving means for receiving signals transmitted over said first carrier frequency and third receiving means for receiving signals transmitted over said second carrier frequency, and control means at each station in said second group for controlling the operating power of said respectively associated second transmitting means in accordance with the intensity of signals received thereat over said first and second carrier frequencies, said control means including first measuring means at each station in said second group for measuring the intensity of signals transmitted only from stations in said first group, said first measuring means being responsive only to the reception by the respectively associated second receiving means of radiant energy transmitted only over said first carrier frequency, said control means also including second measuring means at each station in said second group for measuring the intensity of signals transmitted only from stations in said second group, said second measuring means being responsive only to the reception by the respectively associated third receiving means of radiant energy transmitted only over said second carrier frequency.

6. A radiant energy signaling system having a single two-way radiant energy signaling channel constituted by first and second frequency allocations for the transmission of carrier waves, said system including in combination a first group of signaling stations each having first transmitting means for transmitting signals over said first carrier frequency allocation and first receiving means for receiving signals transmitted over said second carrier frequency allocation, a second group of signaling stations each having second transmitting means for transmitting signals over said second carrier frequency, each station in said second group also having second receiving means for receiving signals transmitted over said first carrier frequency and third receiving means for receiving signals transmitted over said second carrier frequency, first measuring means at each station in said second group for measuring the intensity of signals transmitted over said first carrier frequency and received by said second receiving means, second measuring means at each station in said second group for measuring the intensity of signals transmitted over said second carrier frequency and received by said third receiving means, first control means at each station in said second group for causing said second transmitting means to operate on high power in response to the recognition by said first measuring means of the reception by said second receiving means of signals of low level, and second control means at each station in said second group for superseding the operation of said first control means and for switching said second transmitting means to operation on low power in response to the recognition by said second measuring means of the reception by said third receiving means of signals of low intensity.

7. A radiant energy signaling system in accordance with claim 6 wherein said second control means includes instrumentalities for operating said second transmitting means on high power in response to the recognition by said second measuring means of a lack of reception by said third receiving means of signals transmitted over said second carrier frequency, and wherein said first control means includes means for superseding the operation of said instrumentalities and for switching said second transmitting means to operation on low power in response to a recognition by said first measuring means of the reception by said second receiving means of signals of high level.

8. A radiant energy signaling system having a single two-way radiant energy signaling channel constituted by first and second frequency allocations for the transmission of carrier waves, said system including in combination a first group of signaling stations each having first transmitting means for transmitting signals over said first carrier frequency allocation and first receiving means for receiving signals transmitted over said second carrier allocation, a second group of signaling stations each having second transmitting means for transmitting signals over said second carrier frequency and second receiving means tuned to receive signals transmitted over said first carrier frequency, and traffic coordinating means for controlling the operation of said second transmitting means, said traffic coordinating means comprising third receiving means at each station in said second group tuned to receive signals transmitted over said second carrier frequency, measuring means at each station in said second group for measuring the strength of carrier energy received by said respectively associated third receiving means, first control means at each station in said second group for disabling its respectively associated second transmitting means, first actuating means at each station in said second group for actuating its respectively associated first control means in response to the measurement by its respectively associated measuring means of carrier energy of high level, second control means at each station in said second group for enabling its respectively associated second transmitting means, and second actuating means at each station in said second group for actuating its respectively associated second control means in response to the measurement by its respectively associated measuring means of carrier energy of low level.

9. A radiant energy signaling system in accordance with claim 8 wherein said traffic coordinating means includes additional measuring means at each station in said second group for measuring the strength of carrier energy received by said respectively associated second receiving means, third control means at each station in said second group for enabling its respectively associated second transmitting means, and third actuating means at each station in said second group for actuating its respectively associated third control means in response to the measurement by its respectively associated additional measuring means of carrier energy of low level.

10. A radiant energy signaling system in accordance with claim 9 wherein said traffic coordinating means includes fourth actuating means at each station in said second group for actuating its respectively associated third control means in response to the measurement by its respectively associated additional measuring means of carrier energy of high level, and disabling means for disabling said fourth actuating means, said disabling means being responsive to the operation of said first actuating means.

11. A radiant energy communication system including a plurality of signaling stations and a single radiant energy signaling channel for the transmission of carrier signaling energy between said stations, said stations being divided into a first group and a second group, each of the stations in said first group having first control means for effecting the transmission of carrier energy therefrom on a first fixed power value and second control means for effecting the transmission of carrier energy therefrom on a second fixed power value, said second power value being substantially lower than said first power value, operating means at each of the stations in said first group for alternatively operating the first and second control means thereat, each of the stations in said second group having receiving means tuned to receive the carrier energy transmitted from the stations in said first group, said system having traffic coordinating means for regulating the transmission of carrier energy over said single channel simultaneously from more than one of the stations in said first group, said traffic coordinating means including receiving means at each of the stations in said first group tuned to receive carrier energy transmitted from other stations in said first group, and first enabling means at each of the stations in said first group for enabling the second control means thereat and for simultaneously disabling the first control means thereat, said enabling means at each of the stations in said first group being responsive to the reception by the receiving means thereat of carrier energy transmitted on said second power value.

12. A radiant energy communication system in accordance with claim 11 and having second enabling means at each of the stations in said first group for enabling the first control means thereat and for simultaneously disabling the second control means thereat, said second enabling means at each of the stations in said first group being responsive to an absence of reception by the receiving means thereat of any carrier energy.

13. A radiant energy communication system in accordance with claim 11 and having additional control means at each of the stations in said first group for simultaneously disabling the enabling means thereat together with the first and second control means thereat, said additional control means at each of the stations in said first group being responsive to the reception by the receiving means thereat of carrier energy transmitted on said first power value.

14. A radiant energy communication system in accordance with claim 11 wherein each of said stations in said second group includes means for transmitting carrier energy therefrom on a third fixed power value, each of the stations in said second group being capable of movement with respect to the stations in said first group, additional receiving means at each of the stations in said first group tuned to receive carrier energy transmitted from stations in said second group, measuring means at each of the stations in said first group for measuring the strength of carrier waves transmitted from stations in said second group and received by said additional receiving means thereat, and additional control means at each of the stations in said first group for enabling said second control means and for simultaneously disabling said first control means, said additional control means being responsive to the recognition by said measuring means thereat of the reception by said additional receiving means thereat of strong carrier energy.

15. A radiant energy communication system in accordance with claim 14 wherein each of the stations in said first group includes electroresponsive means for disabling said additional control means thereat, said electroresponsive means at each of the stations in said first group being responsive to the reception by the first-mentioned receiving means thereat of carrier energy transmitted on said first power value.

References Cited in the file of this patent

UNITED STATES PATENTS

| | | |
|---|---|---|
| 2,243,719 | Peterson | May 27, 1941 |
| 2,454,396 | Malling | Nov. 23, 1948 |
| 2,678,998 | Young | May 18, 1954 |
| 2,721,935 | Dorff | Oct. 25, 1955 |
| 2,734,131 | Magnuski | Feb. 7, 1956 |